United States Patent
Lake et al.

(10) Patent No.: US 6,547,447 B2
(45) Date of Patent: Apr. 15, 2003

(54) OPTICAL ALIGNING BY ECCENTRIC LASER WELDING

(75) Inventors: Henry J. Lake, Sidney (CA); William Thomas Moore, Ottawa (CA); Robert Langer, Ottawa (CA); Wendy Cipera, Ottawa (CA); Abdul Jaleel J. Moidu, Nepean (CA)

(73) Assignee: JDS Uniphase Inc., Ottawa (CA)

( * ) Notice: Subject to any disclaimer, the term of this patent is extended or adjusted under 35 U.S.C. 154(b) by 0 days.

(21) Appl. No.: 10/156,485

(22) Filed: May 29, 2002

(65) Prior Publication Data

US 2002/0146209 A1 Oct. 10, 2002

Related U.S. Application Data

(62) Division of application No. 09/678,798, filed on Oct. 4, 2000.

(51) Int. Cl.[7] .................................................. G02B 6/38
(52) U.S. Cl. ............................. 385/57; 385/91; 385/94
(58) Field of Search ............................... 385/55, 57, 58, 385/88–94

(56) References Cited

U.S. PATENT DOCUMENTS 4,834,488 A * 5/1989 Lee ............................ 385/57
5,386,488 A * 1/1995 Oikawa ....................... 385/92
6,038,358 A * 3/2000 Nishiki ....................... 385/37
6,213,560 B1 * 4/2001 Moriyama et al. .......... 385/88

* cited by examiner

Primary Examiner—Tulsidas Patel
Assistant Examiner—Son V. Nguyen
(74) Attorney, Agent, or Firm—Neil Teitelbaum

(57) ABSTRACT

Automated manufacturing in the fiber optics industry has introduced a series of new problems due to the small size of the parts being assembled and the precise optical alignments required. However, processes requiring the manual assembly of parts using glue are slowly being replaced by automated processes involving the laser welding of metallically encased optical parts. Unfortunately, almost every step in the process causes a small degree of misalignment, which may cause the device to fall below transmission standards. The present invention provides a method of assembling an optical device which includes special steps that involve re-aligning the elements in the optical device after other steps in the method have caused a misalignment. In particular, the method of the present invention includes testing the alignment of the optical elements at several stages throughout the assembly process, and applying addition asymmetric welds to the finished product to improve the transmission results.

12 Claims, 4 Drawing Sheets

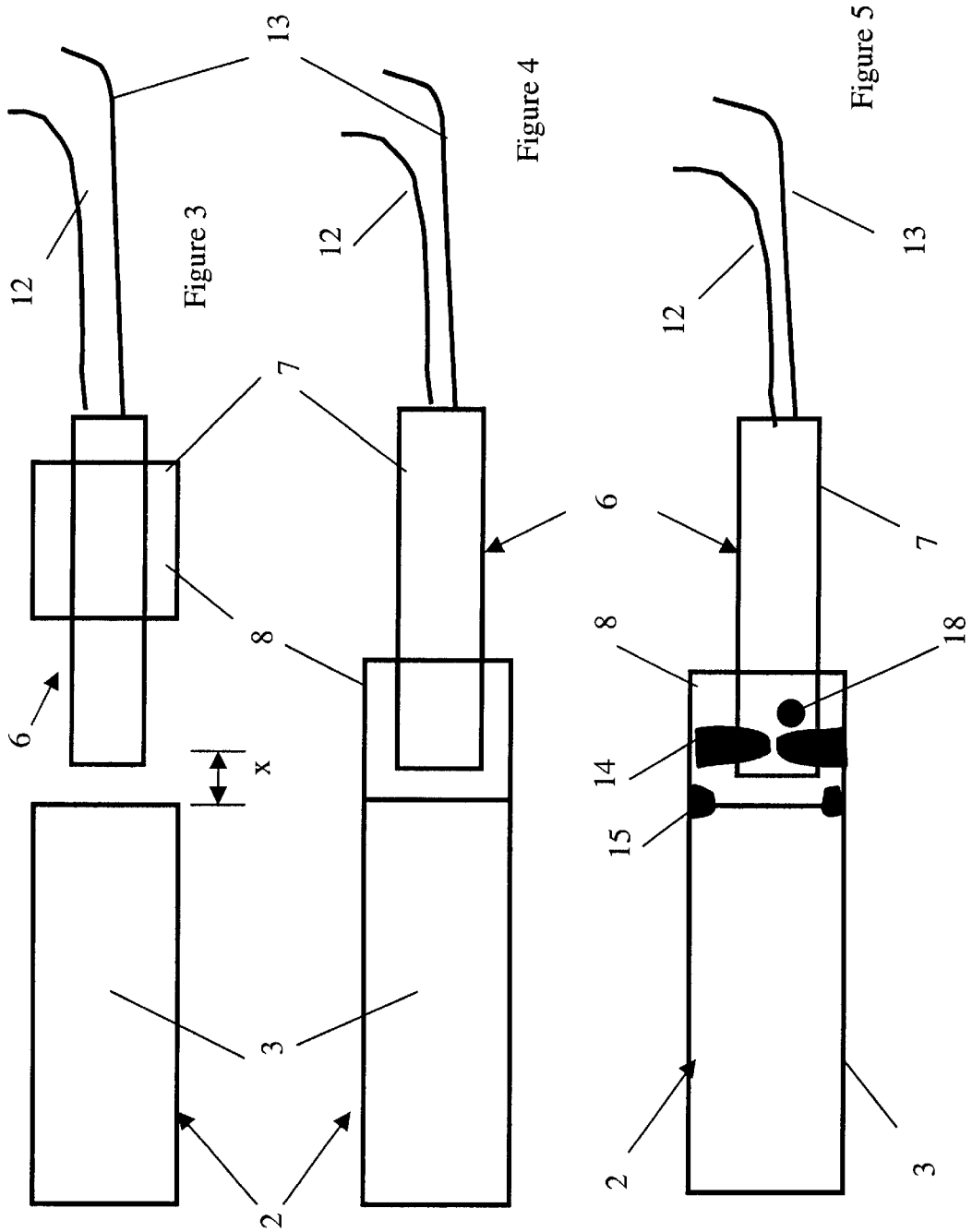

OPTICAL ALIGNING BY ECCENTRIC LASER WELDING

CROSS-REFERENCE TO RELATED APPLICATIONS

This application is a divisional of U.S. patent application Ser. No. 09/678,798 filed Oct. 4, 2000.

TECHNICAL FIELD

The present invention relates to the alignment of optical elements, and in particular to a method of aligning optical elements with the help of a laser spot welder.

BACKGROUND OF THE INVENTION

In the fiber optics industry, a recent push towards automation has forced manufacturers to rethink the standard products and processes, and consider other materials and methods that would make automation easier to implement. Conventionally, glue has been used to fix various elements used in fiber optics together. However, gluing can cause losses in signal strength, and is very difficult to automate. Therefore, the effectiveness of other attaching methods has been explored. One such alternative attaching method is welding. One of the major drawbacks with welding is that it is very difficult to align, hold and weld small elements with the precision required in the fiber optics field.

Some conventional welding machines use fork-shaped tools to hold the elements together while they are being welded. Unfortunately, these devices do not apply evenly distributed forces to the elements, which results in significant shifts during welding. This misalignment is compounded by any post-weld shift, which occurs when the molten metal contracts during solidification, resulting in the two surfaces being pulled together.

One method that has been developed in an attempt to overcome these problems is disclosed in U.S. Pat. No. 5,386,488 issued Jan. 31, 1995 in the name of Yoichi Oikawa. This method still uses a fork-shaped clamping tool to hold the elements during welding, but it overcomes some of the disadvantages of the prior art by placing a jig in between the clamping tool and one of the elements in an attempt to distribute the forces more evenly. The drawbacks in this invention include the need for a large number of welds to hold all the elements together, and the need for the specially designed jig. Each welding step could cause a minor misalignment, which would require an extra realignment step. This delay would greatly increase the cost and time of manufacture for each part. Similarly, the manufacture and application of the jig will also greatly increase the manufacturing time and cost.

An object of the present invention is to overcome the shortcomings of the prior art by providing a method that ensures good optical coupling between elements during an automated assembly process.

SUMMARY OF THE INVENTION

Accordingly, the present invention relates to a method for aligning a first optical element with a second optical element comprising the steps of:

a) securing the first optical element in a first holding means, the first optical element including a first metallic portion mounted thereon;

b) securing the second optical element in a second holding means, the second optical element including a second metallic portion mounted thereon;

c) launching an input signal through the first optical element to the second optical element, and measuring an output from the second optical element;

d) adjusting the relative position of the first and second optical elements until the output from the second optical element is above a predetermined threshold;

e) fixing the first optical element to the second optical element;

f) releasing the first or the second optical elements from the first or the second holding means, respectively;

g) applying a series of test forces to the released one of the first or the second optical element until an optimum deflection of the released one of the first or the second optical element is found, whereby the output from the second optical element is above a desired level; and h) applying at least one weld to the first or the second metallic portion that substantially provides the optimum deflection to the first or the second optical element.

BRIEF DESCRIPTION OF THE DRAWINGS

The present invention will be described in greater detail with reference to the accompanying drawings which represent a preferred embodiment thereof, wherein:

FIGS. 3 to 5 are schematic side views of the elements to be connected, illustrated in FIGS. 1 and 2, at various stages in the connecting process.

DETAILED DESCRIPTION

Figure 1:
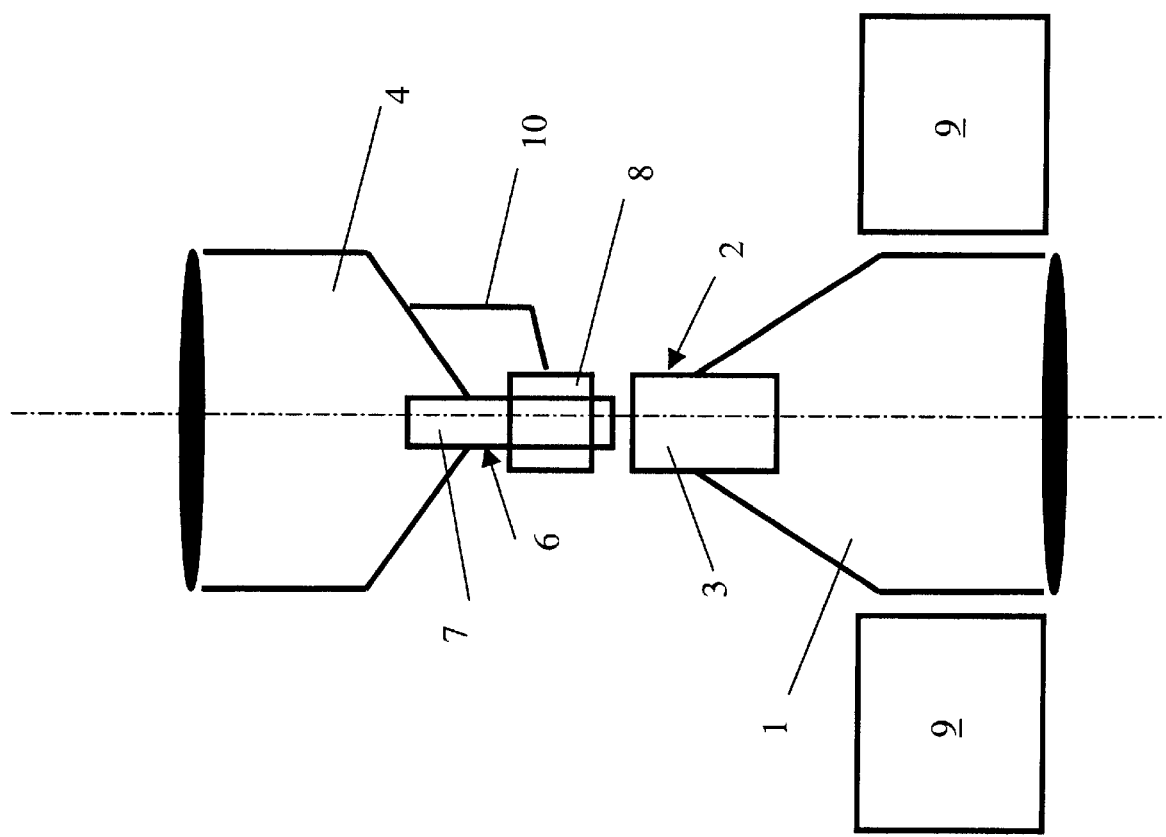
FIG. 1 is a schematic side view of the connecting apparatus according to the present invention in an initial loading stage.

With reference to FIG. 1, the apparatus, according to the present invention, includes a first holding chuck 1 for securing a first element therein. In a preferred embodiment the first element is a cylindrical fiber-optical centerpiece 2 containing a collimating lens, an optical filter, and a focusing lens (not shown). The first element includes a ferromagnetic connecting portion, which in the preferred embodiment is the entire outer housing 3 of the centerpiece 2.

A second holding chuck 4 is provided for securing a second element therein. In the preferred embodiment the second element is a cylindrical fiber-optic ferrule 6, with a ferromagnetic outer sleeve 7, containing one or more optic fibers. The second element also includes a ferromagnetic connecting portion, which in the preferred embodiment is a cylindrical welding sleeve 8. The welding sleeve 8 is initially mounted, but not fixed, on the ferromagnetic outer sleeve 7 and is held independently of the ferrule 6 by an arm 10.

In order to align the two optical elements, the first and second holding chucks 1 and 4 must be relatively adjustable. In a preferred embodiment the second holding chuck 4 is adjustable both laterally, in the x and y directions, and rotatably about the z axis, in the θ direction. Accordingly, the first holding chuck 1 need only be adjustable in the z direction. Obviously, it is possible to coordinate other adjustment scenarios as long as all of the required degrees of freedom are adjustable. The precision required in the alignment of the two elements is totally dependent upon the final use of the combined elements. When the elements are elements of an optical coupling device, the accuracy and precision of the alignment is of utmost importance, requiring a detailed procedure. However, other uses of this invention are possible in which less complicated, even manual, adjustment is possible.

Figure 2:
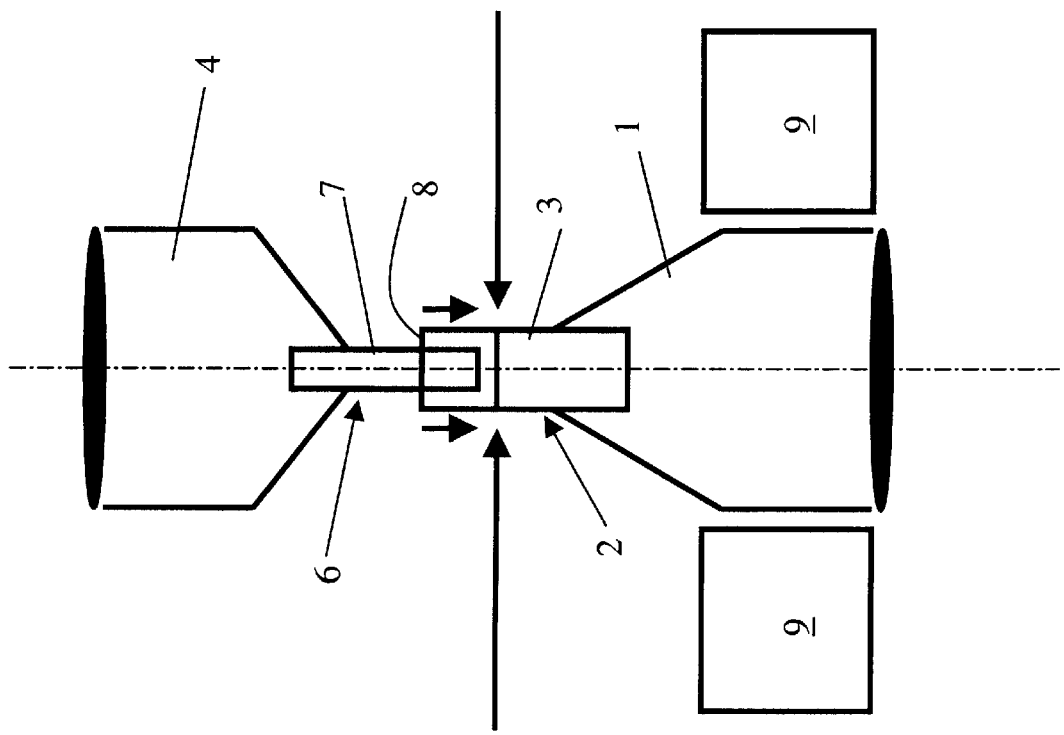
FIG. 2 is a schematic side view of the connecting apparatus, illustrated in FIG. 1, in a subsequent welding stage.

When the first optical element (centerpiece 2) is aligned with the second optical element (ferrule 6), one of the ferromagnetic connecting portions is magnetized, thereby attracting the other ferromagnetic connecting portion, so that when the other ferromagnetic connecting portion is released from its holding chuck the two elements will be held together in the correct alignment. In a first embodiment (FIG. 2), the centerpiece housing 3 is magnetized which attracts the ferrule's welding sleeve 8, which in this case is already attached to the ferrule 6. Activating an electric coil 9, which is wrapped around the holding chuck 1, magnetizes the housing 3 of the centerpiece 2. The resulting electromagnet generates an evenly distributed force F with enough magnitude that the two elements are held together, enabling the two ferromagnetic connecting portions to be fixed together. Preferably, the welding sleeve 8 is welded to the centerpiece housing 3 using laser welders, indicated by arrows 11.

In a preferred embodiment, the ferromagnetic connecting portion (welding sleeve 8) of the second element (ferrule 6) is not initially fixed to the ferromagnetic outer sleeve 7. In this case, during initial alignment, a gap x is intentionally left between the ferrule 6 and the centerpiece 2. Accordingly, when the coil 9 is activated, the welding sleeve 8, after being released from the arm 10 of the second holding chuck 4, slides along the ferromagnetic outer sleeve 7 until it abuts the centerpiece housing 3, thereby covering the gap x. The ferromagnetic outer sleeve 7 of the ferrule 6 is then welded to the welding sleeve 8, and the welding sleeve 8 is subsequently welded to the centerpiece housing 3. Between welding stages the electric coil 9 can be deactivated, while the ferrule 6 is realigned with the centerpiece 2, and then re-energized for the final welding stage.

However, as stated above, it is also within the scope of this invention to have the ferromagnetic connecting portion of the first element fixed thereto, whereby, when the first ferromagnetic connecting portion is magnetized, the second element along with its ferromagnetic connecting portion are released from the second holding chuck and held against the first element.

The method of the present invention will be described with reference to the preferred embodiment in which the first and second elements are elements of an optical coupling device. However, other embodiments of the invention are possible, in which different devices are manufactured, e.g. optical switches with ferromagnetic elements. The first steps in the process relate to securing the centerpiece 2 in the holding chuck 1, and securing the ferrule 6 in the holding chuck 4. With reference to FIG. 3, the first ferrule 6 to be connected to the centerpiece 2 contains the ends of two optical fibers 12 and 13. Optical fiber 12 is an input fiber, while optical fiber 13 carries the light reflected by the optical filter in the centerpiece 2.

The second holding chuck 4 lowers the ferrule 6 into close proximity of the centerpiece 2, while still maintaining a gap x therebetween. To determine whether the two optical elements are in proper alignment, light is fed through the input optical fiber 12 and the amount of reflected light in the optical fiber 13 is compared with a predetermined threshold. For each adjustment in the z direction made by the first holding chuck 1, the second holding chuck 4 makes various adjustments in the x, y and θ directions. In other words the ferrule 6 is moved from side to side, back and forth, and rotated about its longitudinal axis in an effort to determine the best position. Obviously, these steps can be automated and directed by a computer.

When the best position is found the coils 9 are activated, thereby magnetizing the centerpiece housing 3. Then the ferromagnetic welding sleeve 8 is released and drawn into contact with the housing 3 due to its magnetism. At which point a laser welder 11 applies welds 14 to fix the welding sleeve 8 to the ferrule's outer sleeve 7. To ensure that this welding step has not caused a misalignment between the ferrule 6 and the centerpiece 2, the electromagnet 9 is deactivated and the alignment is re-tested. Accordingly, the necessary adjustments are then made by the first and/or second holding chucks 1 and 4. When the elements are in alignment again, the electromagnet 9 is reactivated, the welding sleeve 8 is magnetically held in contact with the centerpiece housing 3, and the laser welder 11 applies welds 15 to fix the welding sleeve 8 and the centerpiece housing 3 together.

Once again a test is done to determine whether welding has caused a substantial misalignment between the elements. In this case forces are repeatedly applied to several locations on the outer free end of the ferrule 6 to determine the magnitude and direction of an optimum force required to tilt the ferrule 6 into a position in which there is improved light reflection in the optical fiber 13. When the best position is determined, one or more welds, preferably spot welds 18, which generate a force equivalent to the aforementioned optimum force, are applied at asymmetric locations, i.e. eccentrically, to the welding sleeve 8.

Figure 6:
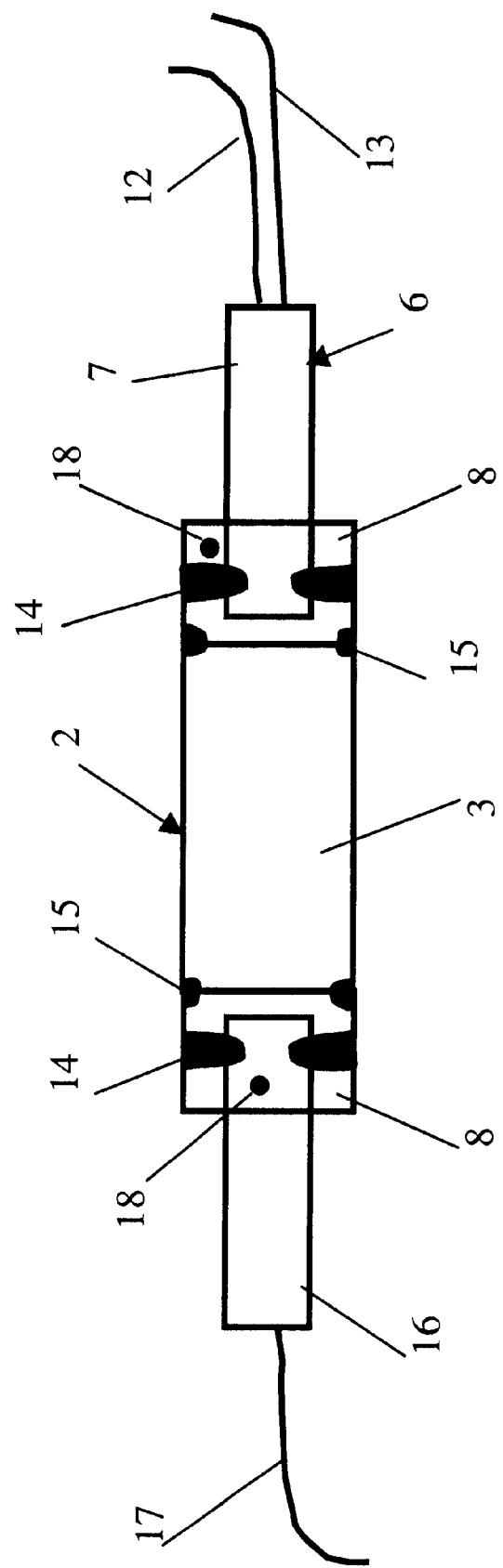
FIG. 6 is a schematic side view of a finished product in accordance with a preferred embodiment of the process of the present invention.

The above process is repeated for a second ferrule 16, (FIG. 6) which has a single transmission optical fiber 17 therein. However, to test the alignment of ferrule 16 with centerpiece 2, light is transmitted through input fiber 12 and measured in transmission fiber 17.

We claim:
1. A method for aligning a first optical element with a second optical element comprising the steps of:
   a) securing the first optical element in a first holding means, the first optical element including a first metallic portion mounted thereon;
   b) securing the second optical element in a second holding means, the second optical element including a second metallic portion mounted thereon;
   c) launching an input signal through the first optical element to the second optical element, and measuring an output from the second optical element;
   d) adjusting the relative positions of the first and second optical elements until the output from the second optical element is above a predetermined threshold;
   e) fixing the first optical element to the second optical element;
   f) releasing the first or the second optical elements from the first or the second holding means, respectively;
   g) applying a series of test forces to the released one of the first or the second optical element until an optimum deflection of the released one of the first or the second optical element is found, whereby the output from the second optical element is above a desired level; and
   h) applying at least one weld to the first or the second metallic portion that substantially provides the optimum deflection to the first or the second optical element.

2. The method according to claim 1, wherein the first optical element includes a ferrule encasing a first and a second optical waveguide; wherein the second optical element includes an optical filter; and wherein step c) includes launching the input signal through the first optical waveguide, and measuring the output reflected off the optical filter to the second optical waveguide.

3. The method according to claim 2, wherein the ferrule includes a metallic outer sleeve; wherein the first optical element includes a welding sleeve mounted on the ferrule; and wherein the second optical element includes a filter sandwiched between two lenses with a metallic housing therearound.

4. The method according to claim 1, wherein the first optical element is a first ferrule encasing a first optical waveguide; wherein the second optical element includes an optical device and a second ferrule encasing a second optical waveguide; and wherein step c) includes launching the input signal through the first optical waveguide and the optical device and measuring the output signal in the second optical waveguide.

5. The method according to claim 1, wherein step e) includes laser welding the first metallic portion to the second metallic portion.

6. The method according to claim 5, wherein the first metallic portion is a first metallic sleeve substantially surrounding at least a section of the first optical element; and wherein the second metallic portion is a second metallic sleeve substantially surrounding at least a section of the second optical element.

7. The method according to claim 6, wherein step e) includes:
  i) sliding the first metallic sleeve along the first optical element into contact with the second metallic sleeve;
  ii) laser welding the first metallic sleeve to the first optical element; and
  iii) laser welding the first metallic sleeve to the second metallic sleeve.

8. The method according to claim 7, further comprising repeating step d) between steps ii) and iii).

9. The method according to claim 7, wherein in step i) the first metallic sleeve is magnetically attracted to the second metallic sleeve.

10. The method according to claim 9, wherein the second holding means includes a chuck for holding the second optical element, and a magnetizer for magnetizing the second metallic sleeve.

11. The method according to claim 10, wherein the first holding means includes a chuck for holding the first optical element during step d), and the magnetized second metallic sleeve for holding the first optical element during step e).

12. The method according to claim 1, wherein step h) includes applying at least one spot weld from a laser welder.

* * * * *